Feb. 8, 1938.   J. M. GOLDBERG   2,107,530
FILM REEL AND FILM ATTACHING MEANS THEREFOR
Original Filed Nov. 9, 1936

Inventor
JACOB M. GOLDBERG
By
Martin E. Anderson
Attorney

Patented Feb. 8, 1938

2,107,530

UNITED STATES PATENT OFFICE 2,107,530

FILM REEL AND FILM ATTACHING MEANS THEREFOR

Jacob M. Goldberg, Denver, Colo.

Application November 9, 1936, Serial No. 109,936
Renewed December 29, 1937

3 Claims. (Cl. 242—74)

This invention relates to improvements in moving picture reels and has reference more particularly to an improved means for attaching the end of the film to the core for the purpose of rewinding the film.

In reels for standard size films no great difficulty is experienced in effecting a connection between the end of the film and the hub or core of the reel, which is usually provided with a slot to receive the film.

In reels for 8 m. m. and for 16 m. m. films the usual way of attaching the end of the film to the core is not satisfactory because the distance between the sides is too short.

Where the reels are of large diameter in comparison with their thickness or length, as in 8 millimeter film reels, it is quite impractical to employ the fastening means that are satisfactory with standard width or 35 millimeter films and other means must therefore be provided for such reels.

It is the object of this invention to produce a reel provided with means which permits the fastening of the leading end of the film to a radially movable member that can be brought into a position near the periphery of the reel where the end of the film can be readily attached to it regardless of the diameter of the reel.

The construction of the reel and the novel film attaching means can be most clearly explained and will be most readily understood when reference is had to the accompanying drawing in which the preferred embodiment of the invention has been illustrated and in which.

Figure 1:
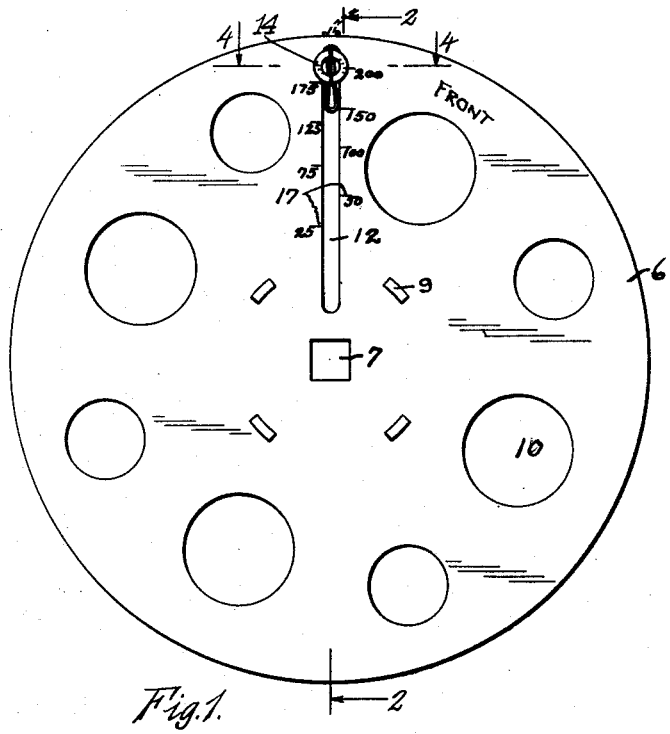
Fig. 1 is a side elevation of a reel constructed in accordance with this invention.

The reel illustrated is designed for 8 millimeter films and is usually constructed from aluminum. The sides 6 are circular aluminum plates provided at their centers with square holes 7. The sides are connected and held in spaced relation by a circular metal ring 8, which will be referred to as the hub. The hub has its opposite edges provided with tongues 9 that extend through suitably spaced openings concentrically positioned in the sides, and have their outer ends riveted. The sides are provided with a plurality of holes 10 for the purpose of decreasing the weight.

The hub 8 has an opening 11 extending its entire length and the sides have radial slots 12 which register with the opening in the hub. The slots terminate between the hub and the non-circular openings 7 in the manner shown in Figs. 1, 2 and 3. The outer ends of the slots terminate a short distance from the peripheries of the sides. In the drawing slots 12 are shown as radial and straight but may be curved if desired.

In order to facilitate the fastening of the end of the film to the reel, a resilient fastening clip has been provided which will now be described.

Figure 4:
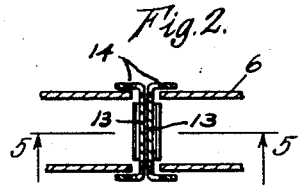
Fig. 4 is a section taken on line 4—4 Fig. 1.
Figure 5:
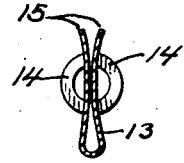
Fig. 5 is a section taken on line 5—5 Fig. 4 and shows the construction of the radially movable film attaching means.

The fastening device or clip is made from any suitable spring metal and is preferably made from a steel strip 13 having a width substantially equal to the distance between the sides. The strip is provided on each side with ears or lugs 14 that can be bent at right angles, as shown in Fig. 4. The strip 13 is bent double, in the manner shown in Fig. 5 and the opposed sides are inwardly convex. The centers of the convex sides are brought so close together that the space between them is less than the thickness of a film. The tips 15 are outwardly flared so as to facilitate the insertion of the end of the film therein.

After the sides and the hub have been assembled, the fastening device is inserted in the slots 12 and the ears 14 bent outwardly into the position shown in Fig. 4. The ears on one side may be bent before the clip is positioned in the slots and the ears or lugs on the other side bent after the clip has been inserted.

Figure 2:
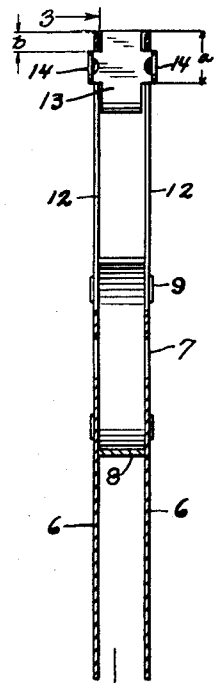
Fig. 2 is a section taken on line 2—2 Fig. 1.
Figure 3:
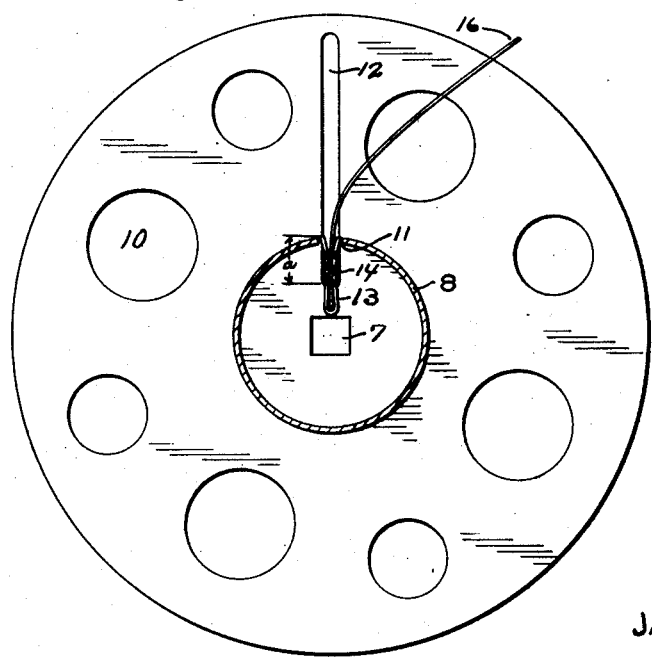
Fig. 3 is a section taken on line 3—3 Fig. 2.

The distance indicated by $a$ in Fig. 2 is equal to the distance from the outer periphery of the hub 8 to the inner ends of the slots 12 so that when the clip is in the position shown in Fig. 3 the tips of the clip will be flush with the outer surface of the hub. The distance from the outer edge of the lugs 14 to the tips of the clip has been designated by letter $b$ and is substantially equal to the distance from the outer ends of the slots to the peripheries of the sides, or slightly greater so that the end of film 16 can be readily inserted between the sides of the clip. When the film is to be inserted the operator holds the clip in the position shown in Fig. 1 by the thumb and forefinger of the left hand and inserts the film by the right hand. After the film has been attached to the clip it is moved to the position shown in Fig. 3 and the film wound one or more turns about the hub.

When a film is unwound from a reel, like the one described, the end of the film will pull out from between the sides of the clip without the production of excessive strains because the film is not bent at the point of attachment as in some attaching devices.

Graduation marks 17 are provided along the sides of the slot, on the front side, as shown in Fig. 1. These graduation marks are provided with numbers that designate the number of feet of film corresponding to each mark, and this enables the operator to get a fairly accurate idea of the number of feet of film on the reel at any time by merely observing the position of the outer periphery of the film, through the slot.

I am aware that reels have heretofore been provided with means to perform a similar function but the device described above and shown on the drawing is specifically different from any of which I have knowledge and performs the function more conveniently and in a more acceptable manner.

Having described the invention what is claimed as new is:

1. A reel for moving picture films, comprising two disks, a hollow circular hub connecting the disks and provided with a peripheral opening, the disks having radially extending slots that register with the ends of the peripheral opening, and a film securing device mounted for movement in the slots, from a position within the peripheral area of the hub to a position adjacent the peripheries of the disks, the securing device comprising a strip of resilient material bent double into the form of a narrow elongated U, each side having a lug projecting from each of its edges, for engagement with the edges of the slots, the lugs having their outer ends bent over to engage the outer surfaces of the disks to limit sidewise movement of the securing device while permitting free longitudinal movement.

2. A film securing device for use with a reel having spaced sides provided with parallel slots, the device consisting of a strip of resilient metal, of a width substantially equal to the distance between the sides, the strip being bent double into the form of a narrow elongated U to form a clip, the sides being inwardly convex, the two ends of the clip having lugs extending outwardly from its edges, for sliding engagement with the edges of the slots, the ends of the lugs being bent outwardly when the clip is in operative position, to engage the outer surfaces of the disks to limit sidewise movement thereof in the reel.

3. A reel for a moving picture film, comprising two side disks, a cylindrical hub connecting the sides and provided with a peripheral opening, the sides each having a slot extending from a point within the periphery of the hub to a point adjacent the periphery of the side disks, the slots in the two disks being parallel, a securing device slidably mounted in the slots, said securing device comprising an elongated strip of resilient metal of a width substantially equal to the distance between the disks, the strip being bent double into the shape of an elongated U, the sides being inwardly convex and normally separated by a distance less than the thickness of the film, the outer ends being flaring to facilitate the insertion of the end of a film, and lugs extending beyond the edges of the film for projection through the slots, the lugs when the securing device is in position, being bent to engage the outer surfaces of the side disks to form guides and means for limiting transverse movement of the securing device with respect to the reel.

JACOB M. GOLDBERG.